US008725118B2

(12) United States Patent
Keller et al.

(10) Patent No.: US 8,725,118 B2
(45) Date of Patent: May 13, 2014

(54) METHOD OF AFFILIATING A COMMUNICATION DEVICE TO A COMMUNICATION GROUP USING AN AFFILIATION MOTION

(75) Inventors: Matthew C. Keller, Algonquin, IL (US); Trent J. Miller, West Chicago, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 418 days.

(21) Appl. No.: 12/415,827

(22) Filed: Mar. 31, 2009

(65) Prior Publication Data

US 2010/0248692 A1     Sep. 30, 2010

(51) Int. Cl.
*H04L 12/58*     (2006.01)

(52) U.S. Cl.
USPC .................. 455/412.2; 455/412.1; 455/414.1; 455/550.1

(58) Field of Classification Search
USPC ......... 455/412.2, 414.1, 550.1, 440; 715/863; 370/338
See application file for complete search history.

(56) References Cited

U.S. PATENT DOCUMENTS

| | | | |
|---|---|---|---|
| 5,666,652 A | 9/1997 | Lin et al. | |
| 7,061,470 B1 | 6/2006 | Sharp | |
| 2001/0003107 A1 | 6/2001 | Lay | |
| 2004/0125777 A1 | 7/2004 | Doyle et al. | |
| 2005/0111400 A1 | 5/2005 | Asthana | |
| 2007/0019616 A1 | 1/2007 | Rantapuska et al. | |
| 2007/0046643 A1 * | 3/2007 | Hillis et al. | 345/173 |
| 2007/0054683 A1 | 3/2007 | Hansen | |
| 2007/0188323 A1 | 8/2007 | Sinclair et al. | |
| 2007/0201376 A1 | 8/2007 | Marshall-Wilson | |
| 2007/0287474 A1 | 12/2007 | Jenkins | |
| 2008/0037723 A1 | 2/2008 | Milstein et al. | |
| 2008/0080407 A1 | 4/2008 | Abbate | |
| 2008/0140650 A1 * | 6/2008 | Stackpole | 707/5 |
| 2008/0160966 A1 * | 7/2008 | McKiou et al. | 455/414.1 |
| 2008/0180301 A1 | 7/2008 | Aaron | |

(Continued)

FOREIGN PATENT DOCUMENTS

| | | | |
|---|---|---|---|
| EP | 1802145 A1 | 6/2007 | |
| EP | 1973314 A1 | 9/2008 | |

(Continued)

OTHER PUBLICATIONS

PCT International Search Report Dated Oct. 29, 2010.

(Continued)

*Primary Examiner* — Jinsong Hu
*Assistant Examiner* — Jean Chang
(74) *Attorney, Agent, or Firm* — Steven A. May

(57) ABSTRACT

A device receives a motion-based affiliation request message and, upon receipt, enters an affiliation motion detection state. If an affiliation motion is detected while in the detection state, a message is sent to a server. The message comprises a request to affiliate to a communication group and/or an indication that the device has detected the affiliation motion. From the perspective of the server, a motion-based affiliation initiation request message is received, and based on the message, at least one device is determined to receive a motion-based affiliation request message. The server sends the affiliation request message to the device and determines whether a message was received. The message comprises one of a request to affiliate to the communication group and/or an indication that the device has detected an affiliation motion. If a message was received, affiliation of the device to the communication group is initiated.

20 Claims, 3 Drawing Sheets

(56) References Cited

U.S. PATENT DOCUMENTS

| | | |
|---|---|---|
| 2008/0214204 A1 | 9/2008 | Ramer et al. |
| 2008/0233996 A1* | 9/2008 | Ogasawara et al. ........ 455/550.1 |
| 2009/0031258 A1* | 1/2009 | Arrasvuori et al. ........... 715/863 |
| 2009/0082051 A1 | 3/2009 | Ruotsi |

FOREIGN PATENT DOCUMENTS

| | | |
|---|---|---|
| EP | 2034389 A1 | 3/2009 |
| GB | 2347593 A | 9/2000 |
| WO | WO0156256 A2 | 8/2001 |
| WO | WO2005086521 A1 | 9/2005 |
| WO | WO2006006020 A1 | 1/2006 |
| WO | 2006127270 A1 | 11/2006 |

OTHER PUBLICATIONS

Joe Teh, Sony Ericsson F305 Motion Sensing Phone; Jun. 16, 2008.
The DoCoMo D904i Motion Sensing Phone; justamp-blogspot-com-2007.
LG SECRET 5MP Touch Phone Launched With Motion-Sensing, DivX; Apr. 25, 2008.
Supplementary European Search Report for Patent Application No. 10762083.3 mailed Oct. 23, 2013.

* cited by examiner

METHOD OF AFFILIATING A COMMUNICATION DEVICE TO A COMMUNICATION GROUP USING AN AFFILIATION MOTION

TECHNICAL FIELD

This technical field relates generally to communication systems, and in particular, it relates to a method of affiliating a communication device to a communication group using an affiliation motion.

BACKGROUND

Formation of a communication group, especially in service industries, such as, public safety, is common. Communication groups allow several users in the group to communicate with one another and may be formed based on factors including a location of an incident, a membership list, or the like.

In order to form a communication group, communication devices affiliate to the desired communication group that has been created. Communication devices can affiliate with any number of communication groups. Methods for enabling users to affiliate with a communication group vary depending on the specificity of the device. For example, land mobile radios have large communication group selector knobs placed at the top of the radio which can affiliate the communication device to a particular, predetermined group. In another example, typical broadband communication devices, such as smart-phones or personal digital assistants, allow users of the communication device to select a communication group through a typical menu-driven user interface, such as, an address book. The user must interact with the user interface through various means, such as a thumbwheel, a roller ball, arrow keys, selector buttons, a touch screen, or the like.

Relatedly, various physical motions, as means of interacting with a device, have been proposed. In these solutions, an accelerometer is used to detect a motion of the device to manipulate the user interface. For example, in one method, users scroll through menus and make menu selections based on detecting a motion of the device. In another solution, a method for simultaneously shaking two devices to associate them in a personal area network is disclosed. Neither of these two methods, however, provides an easy way for public safety users to quickly and easily affiliate to a specific new dynamic group that is being formed.

BRIEF DESCRIPTION OF THE FIGURES

The accompanying figures, where like reference numerals refer to identical or functionally similar elements throughout the separate views, together with the detailed description below, are incorporated in and form part of the specification and serve to further illustrate various embodiments of concepts that include the claimed invention, and to explain various principles and advantages of those embodiments.

Figure 1:
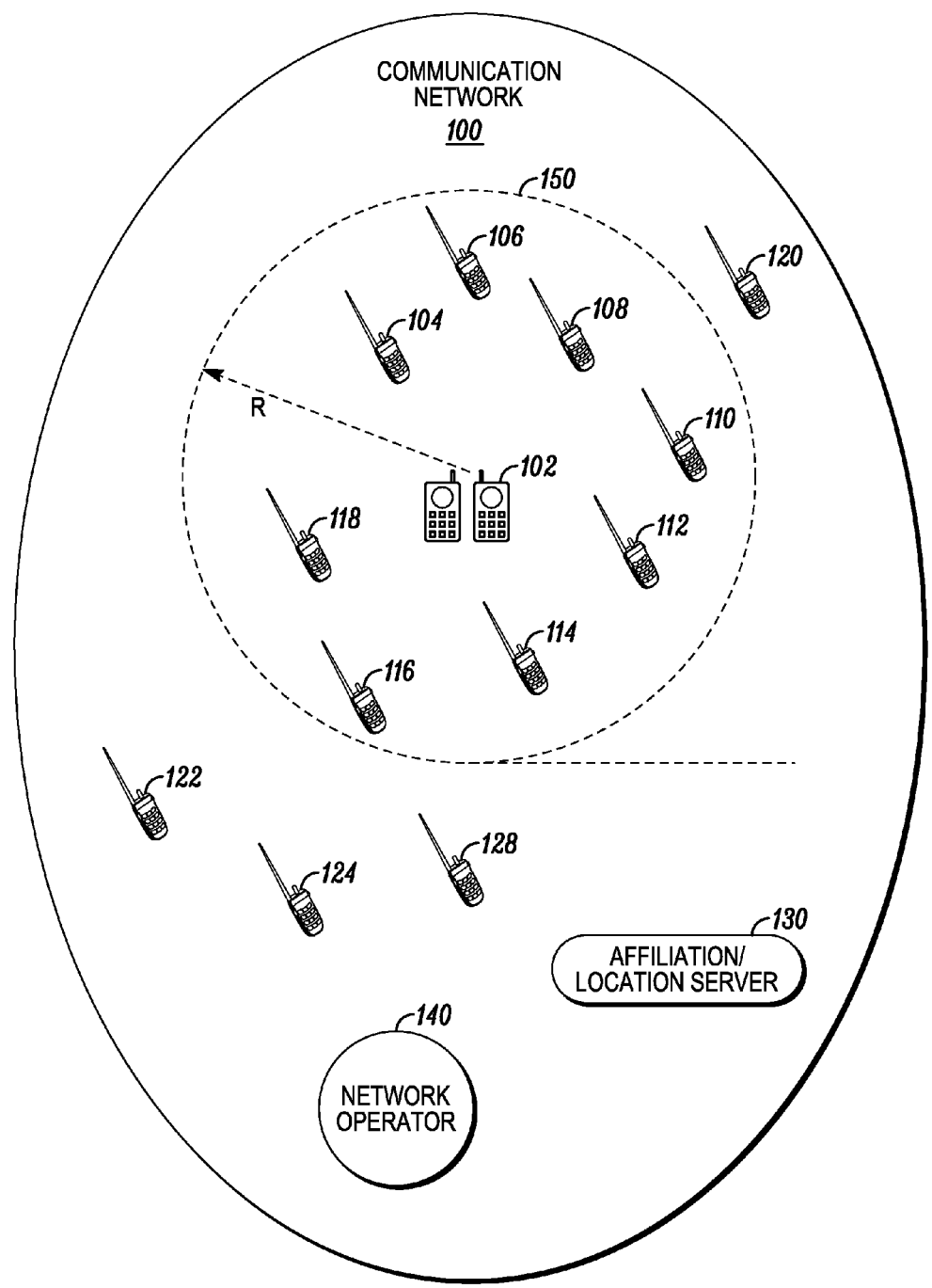
FIG. 1 is a diagram illustrating a communication network in accordance with the principles of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated.

It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

The present disclosure describes a method of affiliating a communication device to a communication group (herein also referred to as a talk group) using an affiliation motion. Use of an affiliation motion allows the user to quickly and easily affiliate with the communication group without having to manipulate knobs and touchpads and/or the like on the communication device. From the perspective of the communication device, a method to affiliate to a communication group comprises the communication device receiving a motion-based affiliation request message, entering an affiliation motion detection state, and if an affiliation motion is detected while in the affiliation motion detection state, sending a message to a server, wherein the message comprises at least one of a request to affiliate to the communication group and/or an indication that the communication device has detected the affiliation motion.

Optionally, the communication device may also alert the user of the communication device to perform an affiliation motion. A type of the affiliation motion to be performed by the user may be identified in the motion-based affiliation request message. Furthermore, the communication device can also receive a message indicating the affiliation motion is no longer to be detected, wherein the communication device exits the affiliation motion detection state. In an alternate embodiment, the communication device may administer a timer, upon expiration of which, the communication device exits the affiliation motion detection state. It should be noted that the communication device may exit the affiliation motion detection state at any time. Additionally, the communication device may receive a message that the communication device is or is not affiliated to the communication group.

From the perspective of a server, a method to affiliate a communication device to a communication group comprises the server receiving a motion-based affiliation initiation request message and sending a motion-based affiliation request to the communication device. In the present disclosure, when the server transmits a motion-based affiliation request message to the communication device, the communication device is a member of a set of target communication devices. In one embodiment, the set of target communication devices may be determined by at least one group identifier (e.g. mapping, preconfigured group, etc.). In other embodiments, the set of target communication devices may be determined by the initiating communication device or its user (e.g. specified in the motion-based affiliation initiation request message), by the server, by a network operator, or some other appropriate device/person in the system. In addition to determining the specific target communication devices in the set, there are a variety of other ways in which the set of target devices may be determined. For example, in one embodiment, the set of target communication devices may be determined by the physical location of the communication devices, such as a location within a physical area, wherein the physical area is, in one embodiment, defined by an operator, in another embodiment, defined by the server or its operator, and yet in another embodiment, specified by the initiating communication device or its user. In another embodiment, the physical area is within a distance of a reference location, such as an incident scene, the initiating communication device, and/or the like. In yet another embodiment, the set of target communication devices may be determined based on information specified in the motion-based affiliation initiation request message. For example, the information may be a common attribute of the communication devices, a physical area in which the communication devices are located, and/or at least one specific communication device and/or at least one group identifier. It should be noted that the physical area may be predetermined or may be dynamically specified or updated by a device and/or user. It should also be noted that even though specific examples are described above, those skilled in the art will recognize and appreciate that there are a variety of other examples and combinations that are not specified but may be used to determine the set of target communication devices that is within the spirit and scope of the present disclosure.

In response to the transmitted motion-based affiliation request message, the server receives a message from the communication device, wherein the message comprises at least one of a request to affiliate to the communication group and/or an indication that the communication device has detected the affiliation motion. Once the message is received, the server initiates affiliation of the communication device to the communication group. In an alternate embodiment, the server may only initiate affiliation of the communication device to the communication group if the communication device is within a physical area.

Finally, the server may send a message to the communication device indicating that the affiliation motion is no longer to be detected and/or sends a message to the communication device to notify it if it is or is not affiliated to the communication group.

In the present disclosure, the communication network may be a narrowband or broadband communication network. In addition, initiating and target communication devices may be either narrowband or broadband communication devices. Examples of narrowband communication devices include, but are not limited to devices commonly referred to as access terminals, mobile radios, portable radios, mobile stations, wired and wireless communications devices, mobile devices, or any other narrowband communication device capable of operating in a wireless environment. Examples of digital narrowband communication systems include, but are not limited to, the Association of Public-Safety Communications Officials (APCO) Project 25 (P25) Phase I, APCO P25 Phase II, Terrestrial Trunked Radios (TETRA), integrated digital enhanced network (iDEN), and European Telecommunications Standards Institute (ETSI) Digital Mobile Radio (DMR). Examples of broadband communication devices include, but are not limited to, mobile phones, cellular phones, smart phones, Personal Digital Assistants (PDAs), and any other communication device capable of receiving or accessing communications from a broadband system. Examples of digital broadband communication systems include, but are not limited to, Institute of Electrical and Electronics Engineers (IEEE) standards for wired and wireless networking, such as 802.11 wireless local area network (WLAN) and 802.16 worldwide interoperability for microwave access (WiMAX), and other wireless technologies such as evolution data optimized (EVDO), universal mobile telecommunications service (UMTS), high-speed packet access (HSPA), and long term evolution (LTE) wireless technologies.

A communication group is a group or collection of members, subscribers, devices, users, and/or subscriber units (collectively referred to herein as "members") configured for group communications over a communication network or system. A communication group can be used to communicate any type of media, including but not limited to simplex and duplex forms of voice, video, multimedia messaging, text messaging, instant messaging, chat, telephony conferencing, computer-aided-dispatch information, discrete media services, progressive media services, and streaming media services between group members.

Affiliation is defined as associating with a communication group in order to participate in communications that take place among the group members. An affiliation motion refers to a movement, action, activity, or other physical gesture which can be physically, mechanically, or electrically perceived by a communication device for the purpose of affiliation. For example, the user may perform a particular type of affiliation motion, such as lifting the device in the air, shaking the device, or tracing a particular pattern in the air while holding the device in his/her hand. In some embodiments, the motion-based affiliation initiation request message specifies the type of affiliation motion needed to be performed by the target communication device.

An affiliation motion detection state, as used herein, refers to a status and/or condition in which the communication device is ready, open, or configured to detect an affiliation motion.

Also, as used herein, a message or notification is a communication that includes, but is not limited to, a transfer of data, including audio, visual, and/or other media or control signaling over one or more wired or wireless communication networks between two or more communication or infrastructure devices.

As used herein, a server characterizes a grouping of logical functions (e.g. affiliation server, location server, or the like) which may be allocated to one or more physical wired or wireless infrastructure and/or communication devices. For example, the server function may be allocated to one or more infrastructure elements in support of a client-server architecture, one or more communication devices in support of a peer-to-peer architecture, or a combination thereof. An infrastructure device is a device that is typically a part of a fixed network infrastructure and can receive information (either control or media, e.g. data, voice (audio), video, etc.) in a signal from a wired or wireless communication device and transmit information in signals to one or more wireless communication devices via a communication link or channel. Examples of the infrastructure device includes, but is not limited to, equipment commonly referred to as controllers, base stations, base transceiver stations, access points, routers, application server or any other type of infrastructure equipment interfacing a wired or wireless communication device or subscriber unit in a wireless environment.

Referring now to the figures, and in particular FIG. 1, there is shown a diagram of a communication network 100 in accordance with the principles of the present disclosure. The communication network 100 is shown having at least one server 130, a network operator 140, an initiating communication device 102, and several target communication devices

104-126. A physical area defining a set of target communication devices is delineated by circle 150. In the example of FIG. 1, the physical area is calculated by a radial distance, R, from an initiating communication device 102, such that all communication devices within the physical radial distance, R, belong to the set of target communication devices configured to receive the motion-based affiliation request message. In one embodiment, all target communication devices within the physical area defined by circle 150 will receive the motion-based affiliation request message, while the communication devices, 120, 122, 124, 126 outside of circle 150 will not receive the motion-based affiliation request message. In another embodiment, a set of target communication devices receive the motion-based affiliation request message, but only the target communication devices within the physical radial distance, R, will be affiliated to the communication group upon request. In yet another embodiment, the physical area is within a distance of a reference location, for example, an incident scene (not shown), wherein a distance between one communication device and the reference location (e.g. the incident scene) and a distance between a second communication device and the reference location are different. In yet another embodiment, the physical area is an area defined by a network operator 140. While this exemplary embodiment utilizes a distance from an initiating communication device 102 as a reference point to determine a physical area which define a set of target communication devices, it will be understood that any reference point, whether determined based on a reference location of an initiating communication device 102, an incident scene, specified by an operator/controller, specified by the user of the initiating communication device or any other reference point is within the scope of the presently claimed disclosure.

Figure 2:
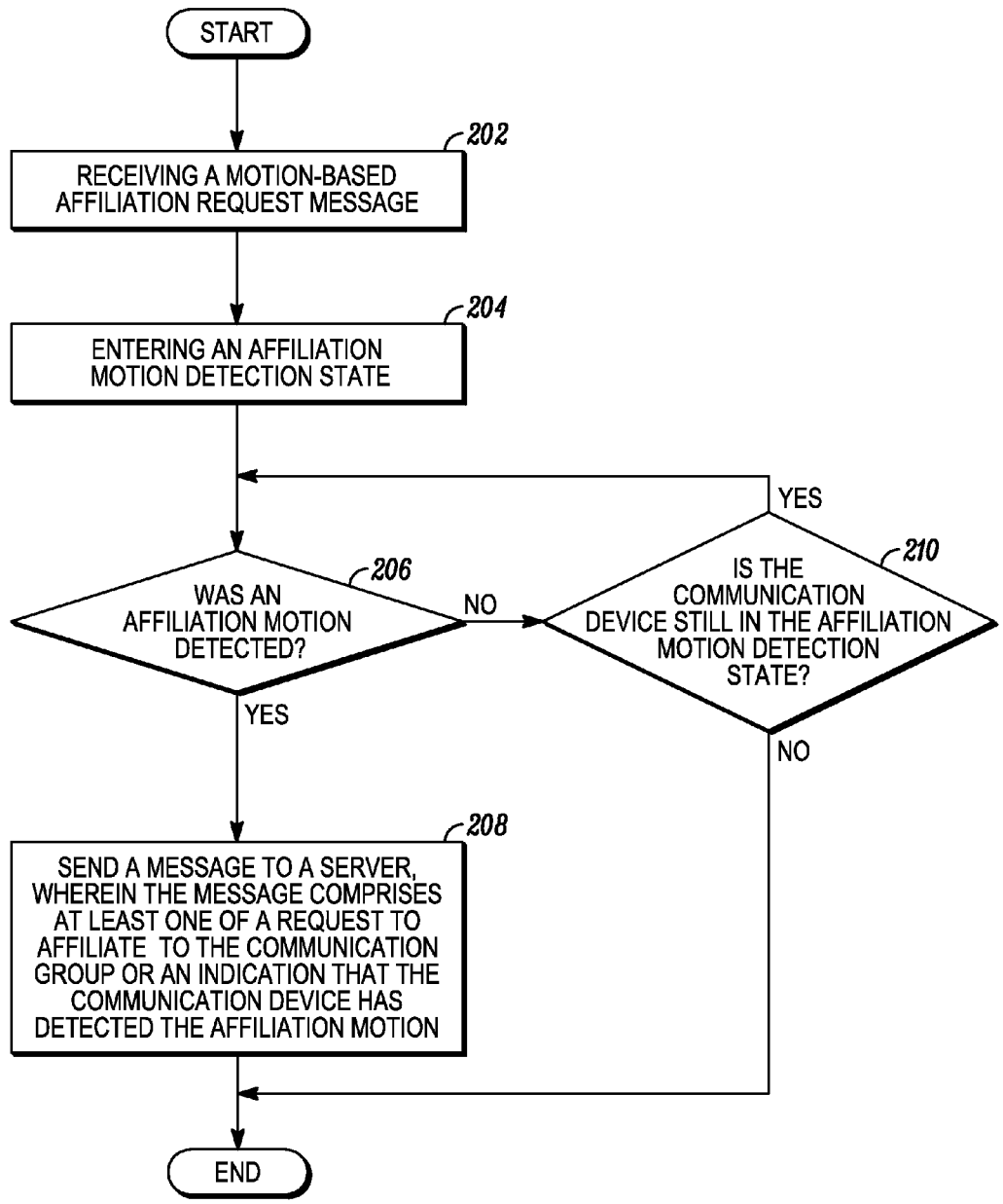
FIG. 2 is a flowchart of an embodiment of the present disclosure.

FIG. 2 is a flowchart describing a method of an embodiment of the present disclosure. From the perspective of a target communication device, a method to affiliate to a communication group comprises receiving a motion-based affiliation request message, at block 202. The motion-based affiliation request message may be transmitted directly or indirectly from a server (e.g. an affiliation/location server), or the motion-based affiliation request message may be transmitted directly from an initiating communication device. The target communication device enters into an affiliation motion detection state, at block 204. Upon entering the affiliation motion detection state, the target communication device may optionally alert the user to perform a particular type of affiliation motion. If the affiliation motion is performed on the target communication device, the affiliation motion can be detected by the target communication device itself, using, for example, an accelerometer, an altimeter, and/or the like. In an exemplary embodiment, a specific and atypical motion, such as, shaking the target communication device or raising the target communication device over the user's head, is designated as the "affiliation motion" in order to prevent false positive detections.

Upon entering the affiliation motion detection state, at block 204, the target communication device determines whether it has detected the affiliation motion, at block 206. The target communication device may attempt to detect the affiliation motion until the target communication device exits the affiliation motion detection state or until the affiliation motion is detected. Thus, if the affiliation motion was detected, at block 206, the target communication device sends a message to the server requesting affiliation to the communication group and/or indicating that the affiliation motion has been detected, at block 208. The target communication device may optionally receive a message indicating that the target communication device is either affiliated to the communication group, or not. In the instance of receiving a message indicating that the target communication device is not affiliated with the communication group, any of the well-known fault management techniques may be implemented, if appropriate, as known by persons of ordinary skill in the art (e.g. retires).

If, however, the affiliation motion was not detected, at block 206, the target device determines whether it is still in the affiliation motion detection state, at block 210. If the target communication device is still in the affiliation motion detection state, at block 210, it continues to attempt to detect the affiliation motion, at block 206. At some point in time, however, the target communication device exits the affiliation motion detection state. In one embodiment, the target communication device receives a message that the affiliation motion is no longer to be detected, and the target communication device exits the affiliation motion detection state. In another embodiment, the target communication device has a timer, and upon expiration of the timer, exits the affiliation motion detection state. As noted above, those skilled in the art will recognize that the target communication device may exit the affiliation motion detection state at any time during the present method and is not limited to any particular step, point, or time during the present method. For example, the target communication device may exit the affiliation motion detection state immediately after entering the affiliation motion detection state, before or after affiliation to the communication group, or at any time during the claimed method. Once the target communication device exits the affiliation motion detection state, it no longer attempts to detect the affiliation motion until a subsequent motion-based affiliation request message is received.

Figure 3:
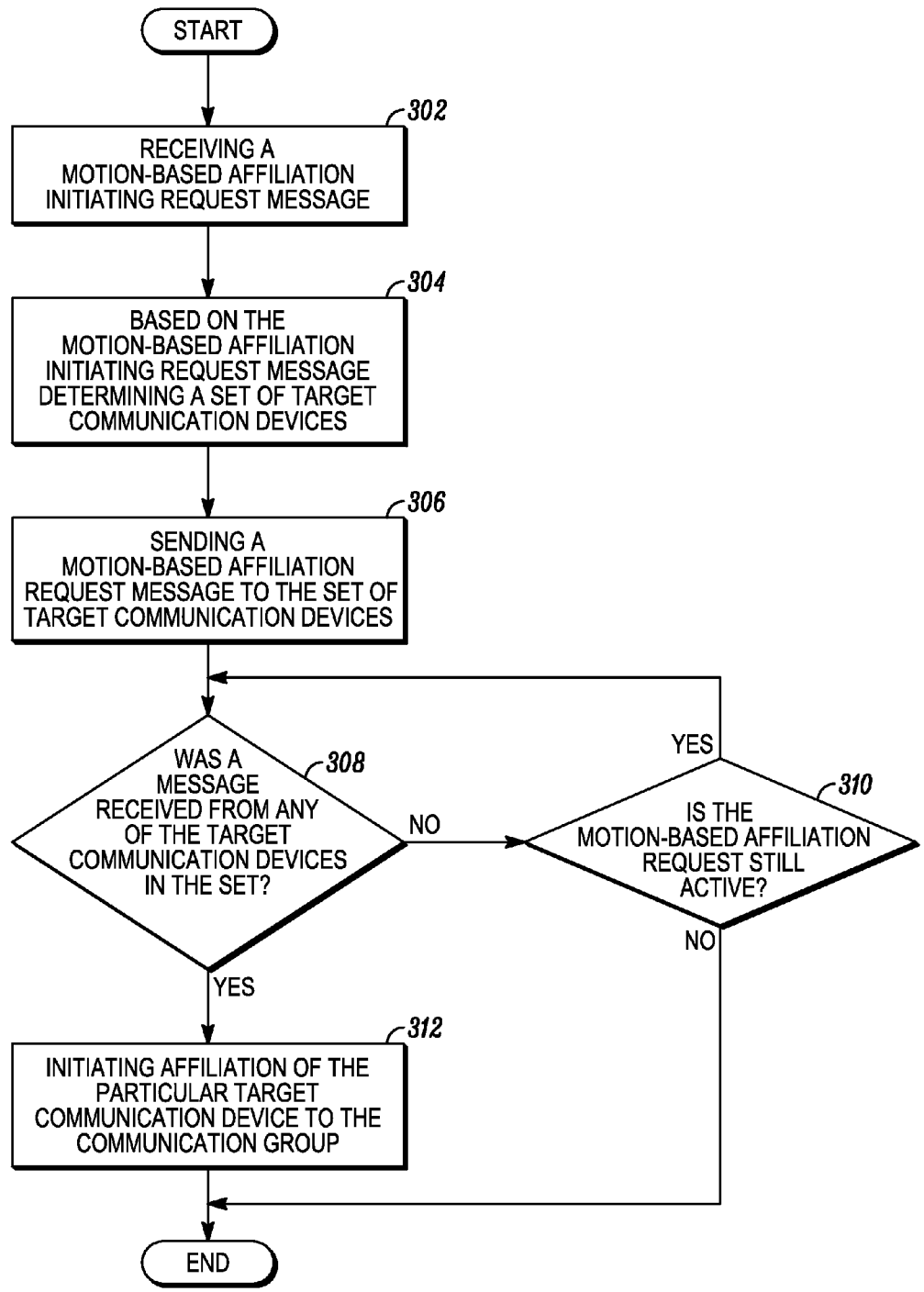
FIG. 3 is a flowchart of another embodiment of the present disclosure.

FIG. 3 illustrates another embodiment of the present disclosure at the server. From the perspective of the server, the method to affiliate a communication device to a communication group comprises receiving a motion-based affiliation initiation request message, directly or indirectly, from an initiating communication device which desires to form a communication group, at block 302.

Based on the motion-based affiliation initiation request message, the server determines a set of target communication devices, at block 304. The server may determine the set of target communication devices that are to be members of the communication group in a variety of ways. In one embodiment, the set of target communication devices is determined based on a physical location or area of the target communication devices relative to a reference point (e.g. the initiating communication device, an incident scene, etc.). In another embodiment, the set of target communication devices may be operator defined. In yet another embodiment, the motion-based affiliation initiation request message may determine the set of target communication devices or one or more attributes or group identifiers that can be used to determine the set of target communication devices. Those skilled in the art will recognize that the set of target communication devices may be determined in a variety of ways, and not limited to those examples illustrated above.

Once the set of target communication devices is determined, at block 304, the server sends a motion-based affiliation request message to the set of target communication devices, at block 306. Optionally, the server may indicate that the target communication devices should alert the respective users to perform the affiliation motion.

After sending the motion-based affiliation request message, the server determines whether it has received a message from any of the target communication devices in the set, at block 308, wherein the message requests affiliation to the communication group and/or indicates that the target communication device has detected the affiliation motion. The server continues to determine whether it has received a message from any of the target communication devices in the set as long as the motion-based affiliation request is still active, at block 310. In one embodiment, the server enters an affiliation state upon receipt of the motion-based affiliation initiation request message. The server may remain in the affiliation state for a predetermined time, until the server operator or initiating communication devices cancels the motion-based affiliation request, or the like. Upon receipt of each message received, the server initiates affiliation of the target communication device to the communication group, at block 312. For example, the server may determine if the target communication device is allowed to affiliate with the communication group through standard affiliation processing, such as determining appropriate authentications, authorizations, etc.

In another embodiment, the server may optionally determine the location of the target communication device requesting affiliation a second time to ensure that the target communication device is still within the determined physical area, or still possess the requisite attribute(s), prior to affiliating the target communication device to the communication group. In some embodiments, the server can alert the target communication devices whether they are successfully affiliated to the communication group or not. Examples of when the communication device is advised that it is not affiliated to the communication group are when it is determined that the communication device is not authorized to affiliate to the communication group, when the communication device moves outside of the determined physical area, and the like.

Optionally, once affiliation of the target communication device is complete, or at other appropriate times during the method, the server may send a message to the target communication devices indicating that the affiliation motion is no longer to be detected, and the target communication device should exit the affiliation motion detection state. Again, it will be appreciated that the target communication device may exit the affiliation motion detection state at any time during the present method. The users who desired to be part of the communication group and who successfully executed the affiliation motion are affiliated to the communication group and can participate in normal group communications.

In conclusion, the present disclosure allows for a group of communication devices to quickly and easily affiliate to a communication group by performing an affiliation motion. In the foregoing specification, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus.

An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for indicating status of channels assigned to a talk group described herein. The non-processor circuits may include, but are not limited to, a radio receiver, a radio transmitter, signal drivers, clock circuits, power source circuits, and user input devices. As such, these functions may be interpreted as steps of a method to perform the indicating of status of channels assigned to a talk group described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g. comprising a processing device) to perform a method as described and claimed herein. Examples of such computer-readable storage elements include, but are not limited to, a hard disk, a Compact Disc Read-Only Memory (CD-ROM), an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for operator-assisted affiliation of a communication device to a communication group, the method comprising the steps of:
   at a communication device:
   receiving a motion-based affiliation request message from a remote operator, wherein the motion-based affiliation request message is sent to communication devices within the group that are within a physical area of an incident scene that is not located at the communication device's location, wherein the incident scene is determined by an operator;
   upon receipt of the motion-based affiliation request message, entering an affiliation motion detection state; and
   when an affiliation motion is detected while in the affiliation motion detection state, sending a message to a server, wherein the message comprises at least one of a request to affiliate to the communication group or an indication that the communication device has detected the affiliation motion.

2. The method of claim 1, further comprising alerting a user to perform the affiliation motion.

3. The method of claim 1, wherein a type of the affiliation motion to be performed by a user is determined in the motion-based affiliation request message.

4. The method of claim 1, further comprising:
   receiving, from the operator, a message indicating the affiliation motion is no longer to be detected; and
   exiting the affiliation motion detection state.

5. The method of claim 1, wherein the communication device exits the affiliation motion detection state upon expiration of a timer.

6. The method of claim 1, further comprising receiving a message that the communication device is affiliated to the communication group.

7. The method of claim 1, further comprising receiving a message that the communication device is not affiliated to the communication group.

8. A method of affiliating a communication device to a communication group with the assist of an operator, the method comprising the steps of:
   at a server:
   receiving a motion-based affiliation initiation request message from the operator, wherein the motion-based affiliation request message is sent to communication devices within the group that are within a physical area determined by an operator;
   based on the motion-based affiliation initiation request message, determining at least one communication device to receive a motion-based affiliation request message;
   sending the motion-based affiliation request message to communication devices near an incident scene that is not located at the server's location;
   determining whether a message was received from a communication device, wherein the message comprises at least one of a request to affiliate to the communication group or an indication that the communication device has detected an affiliation motion; and
   when the message was received from the communication device, initiating affiliation of the communication device to the communication group.

9. The method of claim 8 wherein the communication device is a member of a set of target communication devices.

10. The method of claim 9 wherein the set of target communication devices is determined based on at least one group identifier.

11. The method of claim 9 wherein the set of target communication devices is determined based on a physical area.

12. The method of claim 11 wherein the physical area is operator defined.

13. The method of claim 9 wherein the set of target communication devices is based on at least one communication devices specified in the motion-based affiliation initiation request message.

14. The method of claim 9 wherein the set of target communication devices is determined based on a common attribute of the communication devices.

15. The method of claim 9, wherein the set of target communication devices is determined in the motion-based affiliation initiation request message based upon at least one of a common attribute of the communication devices or a physical location of the communication devices.

16. The method of claim 8 wherein the communication device is within a distance of a reference location.

17. The method of claim 8 wherein the communication device is affiliated to the communication group only when the communication device is within a physical area.

18. The method of claim 8, further comprising sending, by the server, a message to the communication device indicating an affiliation motion is no longer to be detected.

19. The method of claim 8, further comprising sending, by the server, a message to the communication device that the communication device is affiliated to the communication group.

20. The method of claim 8, further comprising sending, by the server, a message to the communication device that the communication device is not affiliated to the communication group.

* * * * *